350-6.1 SR XR 3,194,964

S REFERENCE SEARCH ROO

July 13, 1965 M. H. LARSON 3,194,964

INFRARED DETECTING SYSTEM

Filed April 16, 1962

INVENTOR.
MELVIN H. LARSON

BY D. Gordon Angus
ATTORNEY

United States Patent Office 3,194,964
Patented July 13, 1965

3,194,964
INFRARED DETECTING SYSTEM

Melvin H. Larson, Bradbury, Calif., assignor, by mesne assignments, to the United States of America as represented by the Secretary of the Navy Filed Apr. 16, 1962, Ser. No. 188,928
7 Claims. (Cl. 250—83.3)

This invention relates to an infrared detector and more particularly to a reticle for an infrared detector which improves the signal-to-noise ratio from an infrared source.

Infrared optical systems are widely used for military purposes. However, the infrared optical systems heretofore developed were less sensitive during daylight hours when sunshine falling on the earth and clouds substantially increased the infrared background noise. The magnitude of the increase in the background noise was such that on occasions the infrared optical systems could not distinguish between the signal generated by a small infrared source, such as an aircraft engine, and the background radiation.

What is needed, therefore, and comprises the principal object of this invention is to provide an infrared optical system which can reject background radiation.

A further object of this invention is to provide an infrared detecting system which can improve the signal-to-noise ratio between a signal generated by a small infrared source and the extended infrared background.

The invention in its broadest aspect comprises using a plural frequency reticle with an infrared optical system. Infrared radiation from a target in the field of view of the optical system passes through the optical system and forms an image on the surface of the reticle. A mechanical scan system moves the image across the reticle so that the radiation passing through the reticle is interrupted. The frequencies at which the radiation is interrupted depend on the design of the reticle. The radiation passing through the reticle falls on an infrared detector and the detector generates pulsating signals in accordance with the frequencies at which the radiation is interrupted by the reticle.

If the optical system is viewing an extended infrared radiating background, the image on the reticle will be so large that all of the possible frequencies of interruption will appear in the pulsating signals generated by the infrared detector. If the optical system is viewing a point source of infrared radiation, less than all the possible frequencies of interruption will appear in these pulsating signals. Appropriate circuitry is provided to indicate when all or less than all of these possible frequencies are present in the output of the infrared detector whereby the infrared optical system can distinguish between a point source and an extended infrared background.

These and other objects of the invention will become more apparent when read in the light of the accompanying drawings and specification wherein.

Figure 1:
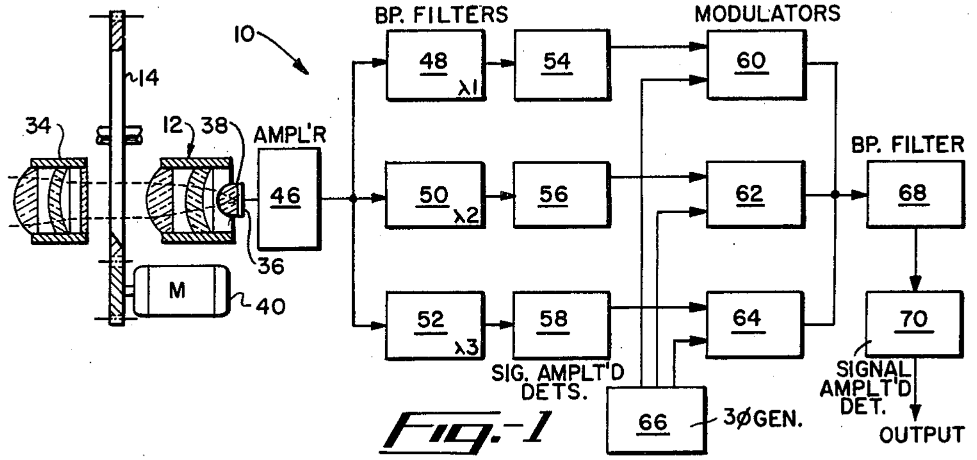
FIGURE 1 is a diagrammatic view of an infrared optical system employing a plural frequency reticle along with block diagrams of associated electronic circuits which utilize the information supplied by the plural frequency reticle.

Referring now to FIGURE 1 of the drawing, an infrared optical scanning system indicated generally by the reference numeral 10 comprises an objective lens assembly indicated generally by the reference numeral 12. A three-frequency reticle 14 is positioned at the focus of the objective lens assembly 12 whereby the image of a radiating object in the field of view of the optical system is focused thereon. The reticle itself comprises a repeating sequence of three separate linear patterns 16, 18, and 20 (see FIGURE 2). Pattern 16 comprises opaque bars 22 separated from each other by radiation-transmitting portions 24 and in this particular embodiment, the opaque portions 22 and the radiation-transmitting portions 24 are in uniformly spaced relation to each other. Pattern 18 comprises opaque bars 26 and radiation-transmittitng portions 28. Similarly, pattern 20 comprises opaque bars 30 separated from each other by radiation-transmitting portions 32. Radiation-transmitting portions 24, 28, and 32 are all different in size for reasons to become apparent below. The reticle is positioned so radiation from a distant object in the field of view of the objective lens assembly 12 will be focused on the reticle 14.

A field lens assembly 34 is positioned adjacent the reticle 14 on the opposite side from the objective lens assembly 12. In addition, an infrared sensitive element 36 is secured to lens element 38 in the field lens assembly. With this arrangement, the image of the entrance aperture of the objective lens assembly 12 will be imaged on the infrared sensitive element 36. This prevents radiation passing through the reticle from scanning the infrared sensitive element 36 and thereby introducing spurious signals.

Figure 2:
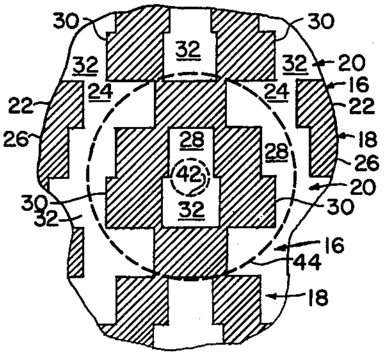
FIGURE 2 is a plan view of a portion of a three-frequency reticle employed with the apparatus shown in FIGURE 1.

The image of a distant object in the field of view of the objective lens assembly and focused on the reticle is caused to move across the surface of the reticle by a suitable scanning mechanism. The scanning mechanism can be of any suitable type; however, in the embodiment shown in FIGURE 1, a rotator 40 is connected to the reticle 14. The operation of the rotator causes the image of an object viewed by the optical system to move over the surface of the reticle, as seen in FIGURE 2. The three patterns on the reticle are positioned parallel to the direction of scan or reticle rotation.

This movement of the reticle with respect to the image or the movement of the image with respect to the reticle causes radiation passing through the reticle to be interrupted. The frequencies at which the radiation is interrupted depends on the size of the image on the reticle. For example, if the object in the field of view has a relatively small image, as indicated by the dotted circular line 42, the image will overlap only two patterns on the reticle; in this case, patterns 18 and 20. Since the radiation transmitting portions 28 and 32 in patterns 18 and 20 are different in size, the radiation passing through the reticle will be interrupted at two separate frequencies. The particular frequencies depend on the rate of vibration, and the size of the radiation transmitting portions 28 and 32.

In contrast, if the objective lens assembly 12 is viewing an extended source of radiation, such as from clouds, the image indicated by dotted line 44 on the reticle will be substantially larger than the point source image 42. In particular, image 44 on the reticle is large enough to cover at least all three separate patterns 16, 18, and 20. Consequently, radiation passing through the reticle will be interrupted at all three characteristic frequencies of the reticle. This interrupted radiation will be directed against the radiation sensitive element 36 so that the radiation sensitive element will generate pulsating signals having frequency components corresponding to the frequencies at which the radiation passing through the reticle has been interrupted.

In particular if $\lambda_1$ corresponds to the frequency of interruption caused by pattern 16 on the reticle and if $\lambda_2$ corresponds to the frequency interruption caused by pattern 18 on the reticle and if $\lambda_3$ corresponds to the frequency of interruption caused by pattern 20 on the reticle, then the output of the radiation sensitive element 36 when an extended radiating source is focused on the reticle will contain frequencies $\lambda_1$, $\lambda_2$, and $\lambda_3$.

The radiation sensitive element 36 is connected to an amplifier 46 for amplifying the pulsating output signals. The output of the amplifier 46 feeds into bandpass filters 48, 50, and 52 which separate the pulsating signals into three channels. Bandpass filter 48 passes frequencies only in a range including $\lambda_1$, while bandpass filter 50 passes frequencies only in a range including $\lambda_2$ and bandpass filter 52 passes frequencies in a range including $\lambda_3$.

The output of bandpass filters 48, 50, and 52 feed into signal amplitude detectors 54, 56, and 58 respectively, for amplitude detection. The output of the signal amplitude detector feeds into modulators 60, 62, and 64 respectively. In addition, a three-phase generator 66 feeds into these modulators whereby the modulators 60, 62, and 64 modulate the three separate phases of generator 66 in accordance with the magnitude of the signal from the signal amplitude detectors 54, 56, and 58.

The output of the modulators 60, 62, and 64 are added and fed through bandpass filter 68 which removes the frequency of the three-phase generator 66. In addition, modulator outputs are adjusted so that equal modulated inputs resulting from an extended radiating source in the field of view of the objective lens assembly 12 produces equal amplitudes of each phase. Consequently the resultant output of the filter 68 is zero when the objective lens assembly 12 is viewing an extended radiating source. Hence the signal amplitude detector 70 will have no response.

In contrast, if the objective lens assembly 12 is viewing a point source of radiation, the dotted circular line image 42 will not be large enough to cause the radiation to be interrupted by all three patterns, so that at least one and possibly two of the signal amplitude detectors will have no output. Consequently, the sum of the outputs of the modulators with the generator or carrier frequency removed will no longer be zero and the signal amplitude detector 70 will have a response. In this way, the infrared optical scanning system can distinguish between a point source and an extended source of infrared radiation in its field of view.

By way of specific example, the widths of the opaque bars in patterns 16, 18, and 20 are $\frac{1}{14}$ of an inch, $\frac{1}{18}$ of an inch, and $\frac{1}{22}$ of an inch, so that the corresponding frequencies $\lambda_1$, $\lambda_2$, and $\lambda_3$ will be 934 c.p.s., 1200 c.p.s., and 1470 c.p.s. when the scanning rate is 133 inches per second. The reticle detail should be as fine as possible and is usually limited by the optics of the equipment.

With $\lambda_1$, $\lambda_2$, and $\lambda_3$ having the frequencies described above bandpass filter 48 should be designed so it passes frequencies in the range of 904 c.p.s. to 964 c.p.s. Similarly, bandpass filter 50 should be designed so that it passes frequencies in the range 1163 c.p.s. to 1237 c.p.s., and bandpass filter 52 should be designed to pass frequencies in the range 1424 c.p.s. to 1516 c.p.s. The three-phase generator 66 may operate at 10 kc. and consequently, bandpass filter 68, as shown in FIGURE 1, should be designed to remove the 10 kc. frequency.

The above-described infrared optical scanning system employing the three-frequency reticle, is efficient, and has a high signal-to-noise ratio. However, the circuitry is somewhat complex and in some circumstances, it may be desirable to trade a lower signal-to-noise ratio and the possibility of signal cancellation for the more precise but more complicated and expensive three-frequency reticle system.

Figure 3:
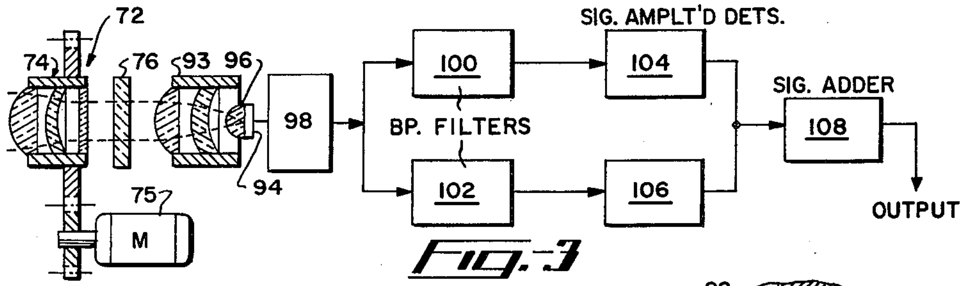
FIGURE 3 is a diagrammatic view of an infrared optical system using a two-frequency reticle along with block diagrams of electronic circuitry used therewith.

For this reason, a two-frequency reticle system indicated generally by the reference numeral 72 in FIGURE 3 employs an objective lens assembly 74 and a two-frequency reticle 76. The reticle is positioned at the focus of the objective lens assembly 74 and comprises a repeating series of two patterns 78 and 80 (see FIGURE 4). Pattern 78 comprises opaque bars 82, separated from each other by radiation-transmitting portions 84. Similarly, pattern 80 comprises opaque bars 86, separated from each other by radiation transmitting portions 88. It is noted that the size of the opaque bars and radiation transmitting portions in patterns 78 and 80 are different.

The objective lens assembly 74 may be rotated by motor 75 so that the image of an object in the field of view of the objective lens assembly moves over the surface of the reticle in a manner well-known in the art. The patterns 78 and 80 on the two-frequency reticle are disposed parallel to the direction of scan, as shown in FIGURE 4 of the drawings.

In this way, when a target or object in the field of view of the objective lens is very small, and amounts to a point source, the movement of the small or point source image 90 on the reticle will permit radiation to pass through the reticle at a frequency determined by the size of the opaque and radiation transmitting portions and by the rate of the scan.

Figure 4:
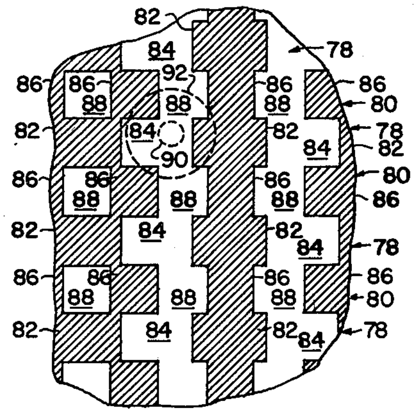
FIGURE 4 is a plan view of a portion of the two-frequency reticle used with the electronic circuits and the infrared optical system disclosed in FIGURE 3.

As shown in FIGURE 4, the patterns are designed so that when the objective lens assembly 74 is viewing a point source, the image 90 moves over a single pattern and when the objective lens assembly is viewing an extended radiating source such as from radiating clouds, its image 92 will be greater than any single pattern. Consequently, the radiation passing through the reticle from an extended radiating source will be interrupted at two frequencies. The magnitude of these frequencies depend on the particular dimensions of the pattern 78 and 80 and on the rate of the scan.

A field lens assembly 93 is positioned on the side of the recticle 76 opposite to the objective lens assembly. In addition, a radiation-senstive element 94 is to be secured to one of the lenses 96 in the field lens assembly in a manner well-known in the art. In this way, the frequencies $\lambda_5$ and $\lambda_6$ at which the radiation passing through the recticle 76 is interrupted, will appear in the output of the radiation sensitive element 94 in the form of pulsating signals.

The output of the radiation-sensitive element 94 is amplified by amplifier 98. The amplifier output 98 is divided into two channels by means of bandpass filters 100 and 102 (see FIGURE 3). The output of the bandpass filters are connected to signal amplitude detectors 104 and 106 respectively, and it is noted that signal amplitude detector 106 has an output which is 180° opposite in phase to signal amplitude detector 104. The outputs of the signal amplitude detectors 104 and 106 are added together in a signal adder 108.

When signals of equal amplitude occur in each channel, such as when the objective lens assembly 74 is viewing an extended radiating background, the output of the signal adder 108 will be zero. However, when the objective lens 74 is viewing a point source of radiation, its image 90 will be scanned over a single pattern in the reticle, so that the output of one of the signal amplitude detectors 104 and 106 will be zero. Consequently, the sum of the outputs of the signal amplitude detectors will not cancel each other. In this way, optical infrared optical scanning system can distinguish between a point source of radiation and an extended background source.

In the reticle shown in FIG. 4, the opaque portions of pattern 78 bar widths of $\frac{1}{14}$ of an inch, while the opaque of pattern 80 has bar widths of $\frac{1}{22}$ of an inch. With the same scanning rate as described in the embodiment shown in FIGURE 1, the two frequencies $\lambda_5$ and $\lambda_6$ generated by the reticle 76 will be 934 c.p.s. and 1470 c.p.s. Consequently, bandpass filter 100 should be designed to pass frequencies in the range 904 c.p.s. to 964 c.p.s. and bandpass filter 102 should be designed to pass frequencies in the range 1424 c.p.s. to 1516 c.p.s.

If the image 90 of a point source of radiation is scanned along the junction between the patterns, equal signals could occur in each channel causing a cancellation to occur, producing an erroneous indication at the output of the signal adder. In some situations, this possibility may be tolerable. If not, this possibility could be eliminated by tilting the reticle slightly so that the point image source must pass through the center of one reticle pattern or the other. The various circuits shown in block diagrams in FIGURES 1 and 3 are all conventional and are widely known in the literature. For example, the amplifier 46 shown in FIGURE 1 and amplifier 98 shown in FIGURE 3 may be like those shown on page 351 of the text book Electronic and Radio Engineer, by Terman. The bandpass filter used with both embodiments of the invention may be of a type shown on page 71 of the above-described text. The signal amplitude detectors used may be of the type shown on page 548 of the above-referenced text, and the modulator used in the circuits may be like those shown on page 539.

It is to be understood that the form of the invention herewith shown and described is to be taken as a preferred example of the same, and that various changes in the shape, size, and arrangement of the parts may be resorted to without departing from the spirit of this invention or the scope of the claims.

I claim:

1. In an infrared optical scanning system, a plural frequency reticle positioned at the focus of the optical system whereby the image of a radiating object viewed by the optical system is focused on the reticle, an infrared senstive detector associated with said reticle for receiving radiation passing therethrough, means for causing the image on the detector to move over the surface of the detector whereby the radiation passing through the reticle is interrupted and the frequencies at which the radiation is interrupted depends on the size of the image on the reticle, the output of said infrared senstive detector generating pulsating signals at frequencies corresponding to the frequencies at which the radiation is interrupted, and means connected to said detector for determining when less than all the frequencies of radiation for which the reticle was designed are falling on the detector to indicate that the optical system is viewing a point source of radiation.

2. An infrared optical scanning system, a three-frequency reticle comprising a repeating sequence of three separate linear patterns of opaque bars, the bars in each pattern uniformly separated from each other by radiation transmitting portions, an infrared sensitive detector associated with said reticle for receiving radiation passing therethrough, said patterns oriented parallel to the direction of scan, whereby the radiation passing through the reticle is interrupted and the number of frequencies at which the radiation is interrupted depends on the size of the image on the reticle so that when the optical system is viewing a radiating point source, the size of the image on the reticle will be so small that it will pass over less than the three separate patterns of opaque bars whereby the number of frequencies at which the radiation is interrupted will be less than three, and when the optical system is viewing an extended radiating background the size of the image on the reticle will be so large that during the scan it will pass over all three separate patterns of opaque bars so that the radiation passing through the reticle will be interrupted at three frequencies, the output of said infrared senstive detector generating pulsating signals at frequencies corresponding to the frequencies at which the radiation passing through the reticle is interrupted, and means connected to said infrared detector for determining when the output of said infared sensitive detector has less than the three possible frequencies of interruption to indicate that the optical system is viewing a point source.

3. The infrared optical scanning system described in claim 2 wherein said means connected to said infrared detector for determining when the output of said infrared senstive detector has less than the three possible frequencies comprises three bandpass filters connected to said infrared detector to separate the pulsating frequencies at the output of said infrared detector into three separate channels, each channel connected to the input of a signal amplitude detector, the output of each signal amplitude detector connected to an associated modulator, a three-phase signal generattor connected to each modulator, the modulated outputs of each channel adjusted so that equal modulator inputs create equal amplitudes of each phase, and so the resultant output of the modulators in each channel is zero if equal signals appear in each channel caused by an extended infrared background source, while point source infrared radiation sources create signals in less than all of the channels, so that the sum of the modulator outputs is not zero.

4. In an infrared optical scanning system, a two-frequency reticle comprising a repeating sequence of two separate linear patterns of opaque bars, the bars in each pattern uniformly separated from each other by radiation transmitting portions, an infrared sensitive detector associated with said two-frequency reticle for receiving radiation passing therethrough, said patterns oriented parallel to the direction of scan whereby the radiation passing through the reticle is interrupted and the number of frequencies at which the radiation is interrupted depends on the size of the image on the reticle, so that when the optical system is viewing a radiating point source, the size of the image on the reticle will be so small that it will pass over less than the two separate patterns of opaque bars whereby the radiation passing through the reticle will be interrupted at only one frequency, and when the optical system is viewing an extended radiating background the size of the image on the reticle will be so large that during the scan it will pass over the two separate patterns of opaque bars, so that the radiation passing through the reticle is interrupted at two frequencies, the output of said infrared sensitive detector generating pulsating signals at frequencies corresponding to the frequencies at which the radiation passing through the reticle is interrupted, and means connected to said infrared detector for determining when the output of said infrared detector has only one frequency to indicate that the optical system is viewing a point source.

5. The infrared optical system described in claim 4 wherein said means connected to said infrared detector for determining when the output of said infrared sensitive detector has only one frequency comprises two bandpass filters connected to said infrared detector to separate the pulsating frequencies at the output of said infrared detector into two separate channels, each channel connected to the input of a signal amplitude detector, one signal amplitude detector having a positive output and the other signal amplitude detector having a negative output, the output of each signal amplitude detector connected to a signal adder whereby when signals of equal amplitude occur in each channel as when the optical system is viewing an extending radiating background source, the net output of the signal adder is zero, and when the optical system is viewing a point source of radiation, the image on the reticle is so small that the radiation is scanned by only one of the linear patterns of opaque bars whereby the net output of the signal adder is not zero, to indicate that the infrared optical scanning system is viewing a point source of radiation.

6. An infrared detecting system capable of detecting a small infrared source in an extended infrared background comprising reticle means having a plurality of dissimilar linear patterns thereon, said patterns having alternate infrared transmitting portions and portions opaque to infrared radiation, infrared sensitive detector means in spaced relation with said reticle means, optical means for directing radiation toward said reticle means and focusing radiation traversing said reticle means on said detector means, scanning means for moving incident radiation across said reticle means so that said detector means will receive frequency information corresponding to the patterns of said reticle means, and means for amplifying the output of said detector means and determining when said output includes information from less than all of the patterns of said reticle means to indicate that the optical means is viewing a point source of infrared radiation.

7. The system claimed in claim 6 wherein the last mentioned means include a broadband amplifier for amplifying signals representative of all of said patterns, low-bandpass filter means for separating the amplified signals, amplitude detector means for detecting the amplitude of the separated signals, combined polyphase generator and modulator means for modulating the amplitude detected signals, and high-bandpass filter means for passing an output signal which is zero when equal inputs to the modulator means create equal amplitudes of each phase and other than zero when there are unequal inputs to the modulator means so that extended infrared background sources create equal modulated signals and point sources of infrared radiation create unequal modulated signals.

References Cited by the Examiner

UNITED STATES PATENTS

| | | | |
|---|---|---|---|
| 2,943,204 | 6/60 | Greenlee et al. | 250—233 X |
| 2,949,536 | 8/60 | Langton | 250—83.3 X |
| 3,083,299 | 3/63 | Cruse | 250—233 X |

RALPH G. NILSON, *Primary Examiner.*

ARCHIE R. BORCHELT, *Examiner.*